United States Patent

Walz et al.

[11] Patent Number: 6,083,637
[45] Date of Patent: Jul. 4, 2000

[54] FUEL CELL ENERGY GENERATING SYSTEM

[75] Inventors: Hans Frieder Walz, Geislingen; Detlef zur Megede, Bubesheim, both of Germany

[73] Assignee: DaimlerChrysler AG, Stuttgart, Germany

[21] Appl. No.: 09/030,137

[22] Filed: Feb. 25, 1998

[30] Foreign Application Priority Data

Feb. 27, 1997 [DE] Germany .......................... 197 07 814

[51] Int. Cl.$^7$ .................................................. H01M 8/04
[52] U.S. Cl. ................................ 429/17; 429/19; 429/22; 429/25
[58] Field of Search ........................ 429/17, 19, 22, 429/25, 14

[56] References Cited

U.S. PATENT DOCUMENTS

| | | | |
|---|---|---|---|
| 5,677,073 | 10/1997 | Kawatsu | 429/22 |
| 5,712,052 | 1/1998 | Kawatsu | 429/13 |
| 5,925,476 | 7/1999 | Kawatsu | 429/24 |

FOREIGN PATENT DOCUMENTS

| | | |
|---|---|---|
| 0 692 835 A2 | of 1995 | European Pat. Off. . |
| 0 710 935 A2 | of 1995 | European Pat. Off. . |
| 0 710 996 A1 | of 1995 | European Pat. Off. . |
| 21 57 722 C2 | of 1982 | Germany . |
| 5-905148 | of 1984 | Japan . |
| 2 250 130 | of 1992 | United Kingdom . |
| 2 268 322 | of 1994 | United Kingdom . |

OTHER PUBLICATIONS

Journal of Power Sources, "Hydrogen from methanol for fuel cells in mobile systems: development of a compact reformer", B. Hhoehlein, M. Boe, J. Bogild–Hansen, P. Broeckerhoff, G. Colsman, B. Emonts, R. Menzer, E. Riedel, pp. 143–147, (1996).

*Primary Examiner*—Aron S. Phasge
*Attorney, Agent, or Firm*—Evenson, McKeown, Edwards & Lenahan, P.L.L.C.

[57] ABSTRACT

A fuel cell energy generating system which includes a reformate generating device that contains a hydrocarbon reforming reactor and produces a high-hydrogen reformate, has a fuel cell arrangement to which reformate generated by the reformate generating device can be fed on the inlet side by way of a reformate supply line, having at least one reformate-quality-indicating sensor arranged in the reformate flow path, and having a control unit. A valve is provided in the reformate supply line which can be controlled by the control unit such that it releases or interrupts the feeding of the reformate supplied by the reformate generating device into the fuel cell arrangement as a function of the output signal of the at least one reformate-quality-indicating sensor.

12 Claims, 2 Drawing Sheets

FUEL CELL ENERGY GENERATING SYSTEM

BACKGROUND AND SUMMARY OF THE INVENTION

This application claims the priority of German patent document 197 07 814.1, filed Feb. 27, 1997, the disclosure of which is expressly incorporated by reference herein.

The invention relates to a fuel cell energy generating system.

Full cell systems are used, for example, to provide electric energy in electric vehicles. In one known system in which hot-vapor reforming of methanol is performed in a reformate generating device, methanol and water can be stored in the vehicle in liquid form. The reforming reaction is adjusted such that the generated gas mixture (reformate) is high in hydrogen.

Carbon monoxide contained in the reformate is undesirable because it poisons the fuel cells. It is therefore normally removed in one or several gas purification stages connected downstream of the reforming reactor, for example, by a partial CO-oxidation or a selective separation of the carbon monoxide or of the hydrogen. A carbon monoxide sensor is used, for example, as a reformate-quality-indicating sensor, by means of which the carbon monoxide content in the reformate is monitored in order to carry out certain system control measures as a function thereof.

British Published Patent Application GB 2 250 130 A describes a fuel cell energy generating system of the initially mentioned type, in which the carbon monoxide content of the reformate is measured by a CO-sensor arranged on the input side of the CO-oxidation stage. The information thus obtained is used to adjust the amount of oxygen introduced into the CO-oxidation stage to a stoichiometric measurement in order always to ensure a complete CO-oxidation.

European Published Patent Application EP 0 710 996 A1 describes another fuel cell energy generating system of the initially mentioned type. In different variants, either only one CO-sensor is arranged on the inlet or outlet side of the fuel cell stack or two sensors of different sensitivities are arranged serially on the inlet side of the fuel cell stack. In each case, the respective output signal of the CO-sensor or CO-sensors is fed to a control unit which controls the operation of certain units of the reformate generating device as a function thereof; specifically, a reforming reactor, a CO-converter and a unit for carrying out a partial oxidation reaction. In both that document and European Published Patent Application EP 0 710 835 A2 (which discloses a largely similar system), the systems are controlled by controlling the air quantity introduced into the partial oxidation unit, by increasing the reaction temperature therein and/or in the reforming reactor, or by controlling the reaction temperature in the CO-converter. In the latter document, different constructions of CO-sensors are described; in particular, those which have the structure and method of operation of a single fuel cell, and to which a constant electric consuming device is connected or to which an external potentiostat circuit with a reference electrode is assigned.

In the above-mentioned conventional systems, when an excessive CO-content in the reformate is detected by the respective CO-sensor, even if the reformate generating is completely switched-off, residual reformate with a high CO-content will still reach the fuel cell arrangement, which can reduce the fuel cell activity.

One object of the invention is to provide a fuel cell energy generating system of the type described above, which reacts very rapidly to disturbances in the provision of reformate, and particularly prevents such disturbances from causing damage to the fuel cell arrangement.

These and other objects and advantages are achieved by the fuel cell system according to the invention, in a first embodiment of which a control unit controls a valve that releases or interrupts the flow of reformate gas from the reformate generating device into the fuel cell arrangement, as a function of the reformate quality detected by the sensor. Such interruption may be achieved, for example, by discharging the reformate via a branch line in the form of a bypass around the fuel cell arrangement. The flow of reformate into the fuel cell arrangement, which is released in the disturbance-free system operation, can therefore be interrupted immediately when an insufficient reformate quality is detected (for example, an excessive CO-content in the reformate), by a corresponding control of the valve. In this manner, the penetration of such harmful reformate constituents into the fuel cell arrangement is interrupted immediately. Although the reformate generating device continues to deliver reformate which has an insufficient quality for a certain time period even when switched off completely, such reformate does not arrive in the fuel cell arrangement; rather, it is discharged in a different manner. A poisoning of the fuel cell arrangement, for example, by an excessive amount of carbon monoxide, can therefore be avoided in this fashion.

As a second alternative, which may be provided instead of or in addition to the former alternative, the system has a supply air control valve in the oxygen feeding pipe for the fuel cell arrangement. This valve is controlled by the control unit to regulate the air or oxygen supply to the fuel cell arrangement as a function of the reformate quality detected by the sensor. By a corresponding change of the oxygen supply to the fuel cell arrangement, temporarily higher carbon monoxide concentrations can be permitted in the reformate gas flow without damaging the fuel cells.

In a further embodiment of the invention, one reformate-quality-indicating sensor is provided on the inlet side and one on the outlet side of a reformate purification unit connected downstream of the reforming reactor. In this manner, the reformate quality is monitored at different points of the reformate system, and thus in a very reliable manner. The closer a sensor is positioned in front of the fuel cell arrangement, the more completely it monitors the operation of the whole reformate generating device. On the other hand, a sensor situated farther away from the fuel cell arrangement, provides a long early warning time if an insufficient reformate quality occurs there because of an operational disturbance in the part of the system situated upstream.

According to another embodiment of the invention, the respective sensor has the structure of one of a plurality of fuel cells which form the fuel cell arrangement. A sensor constructed in this manner has the same susceptibility to deteriorations of the reformate quality, particularly with respect to the CO-content in the reformate, as the actual fuel cell arrangement. However, it is smaller and can be monitored in a selective and more precise manner so that it can more rapidly detect changes in the reformate than is possible on the actual fuel cell arrangement.

In still another embodiment, a reformate-quality-indicating sensor is arranged upstream of the inlet side of the reforming reactor, and senses the composition of the gas mixture to be reformed. This sensor can already detect a faulty composition of the gas mixture to be reformed so that the flow of reformate having an insufficient quality into the fuel cell arrangement can be prevented very early.

Finally, in still another embodiment, an oxygen-containing gas flow, taken from an air or oxygen feeding line of the fuel cell arrangement, is fed on the cathode side to a reformate-quality-indicating sensor which has the structure of an individual fuel cell of the fuel cell arrangement. As a result, this sensor can simultaneously monitor the air supply or oxygen supply to the fuel cell arrangement.

Other objects, advantages and novel features of the present invention will become apparent from the following detailed description of the invention when considered in conjunction with the accompanying drawings.

DETAILED DESCRIPTION OF THE DRAWINGS

Figure 1:
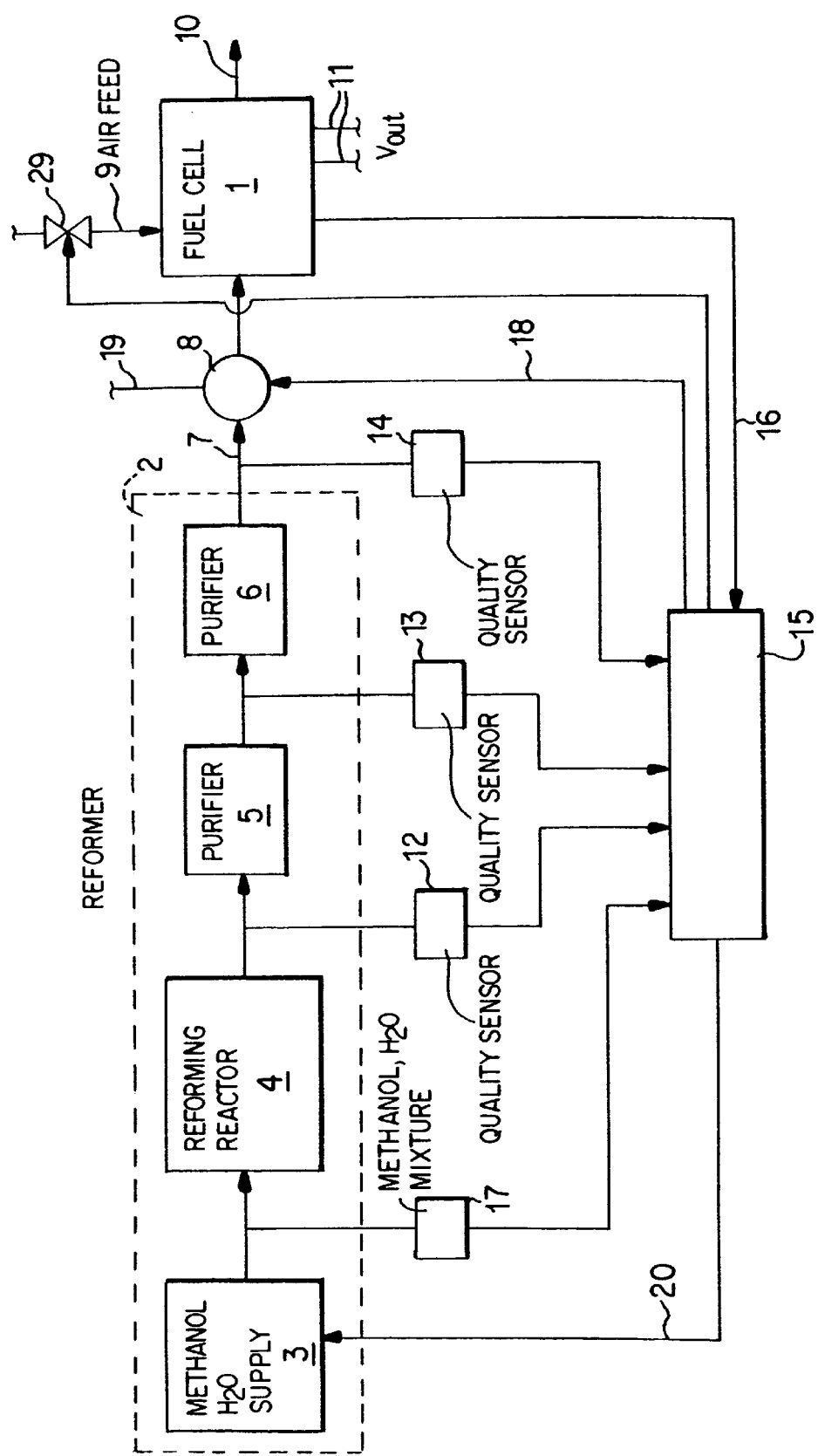
FIG. 1 is a block diagram of a fuel cell energy generating system having several reformate-quality-indicating sensors.

The fuel cell energy generating system illustrated in FIG. 1 contains a fuel cell arrangement 1 of a conventional construction (for example, a so-called fuel cell stack), which receives a high-hydrogen reformate fuel, generated by a reformate generating device 2 by means of a hot-vapor reforming of methanol. For this purpose, the reformate generating device 2 has an input-side supplying and processing unit 3 which supplies methanol and water in liquid form and processes these two constituents to form a hot mixture of water vapor and methanol. This gas mixture to be reacted is supplied to a methanol reforming reactor 4 and is converted there in a conventional process into a high-hydrogen reformate.

As the result of this process, the reformate contains a certain proportion of carbon monoxide and optionally defined residual hydrocarbons. The carbon monoxide should be reduced to less than approximately 50 ppm in order to prevent losses in the fuel cell activity of the fuel cell arrangement 1. Likewise, the content of residual hydrocarbons, which may have longer term, but the more damaging, influence on the fuel cell arrangement 1, is to be limited to a defined degree. For this purpose, a reformate purification unit, consisting of two serially connected reformate purification states 5, 6, is connected downstream of the reforming reactor 4.

The construction of the gas purification stages 5, 6, like that of the reforming reactor 4 and of the supplying and processing unit 3, is of a conventional type and therefore requires no further explanation. The carbon monoxide may be removed, for example, by selective oxidation or methanization. Another possibility is the selective separation of the hydrogen, for example, by using suitable membranes with a specific hydrogen permeability. In addition, the occurrence of residual hydrocarbons in the reformate can be avoided by suitable control of the conversion in the reforming reactor 4.

As long as the reformate generating device 2 constructed in this manner operates without disturbances, it delivers at its output a reformate which consists essentially of pure hydrogen, with other constituents limited to quantities which are not damaging to the fuel cell arrangement 1. This high-hydrogen reformate can be fed to the fuel cell arrangement 1 by way of a reformate feed line 7 in which a controllable 3-way valve 8 is situated.

For generating current, the reformate, which consists essentially of hydrogen, is reacted with oxygen supplied to the fuel cell arrangement 1 on the cathode side by way of an oxygen feed line 9 having a controllable supply air control valve 29. The feed line 9 supplies oxygen, for example, in the form of compressed air. The reaction product is discharged to the outside via an outlet line 10, while the electric energy generated by means of this process by the fuel cell arrangement 1 is present at corresponding electric output lines 11.

For monitoring the quality of the reformate obtained in the reformate generating device 2 (that is, its usability in the fuel cell arrangement 1), reformate quality sensors are provided at different points in the reformate flow path. Specifically a first such sensor 12 is arranged between the reforming reactor 4 and the excluding reformate purification stage 5; a second sensor 13 between the two reformate purification stages 5, 6; and a third sensor 14 on the outlet side of the downstream reformate purification stage.

Figure 2:
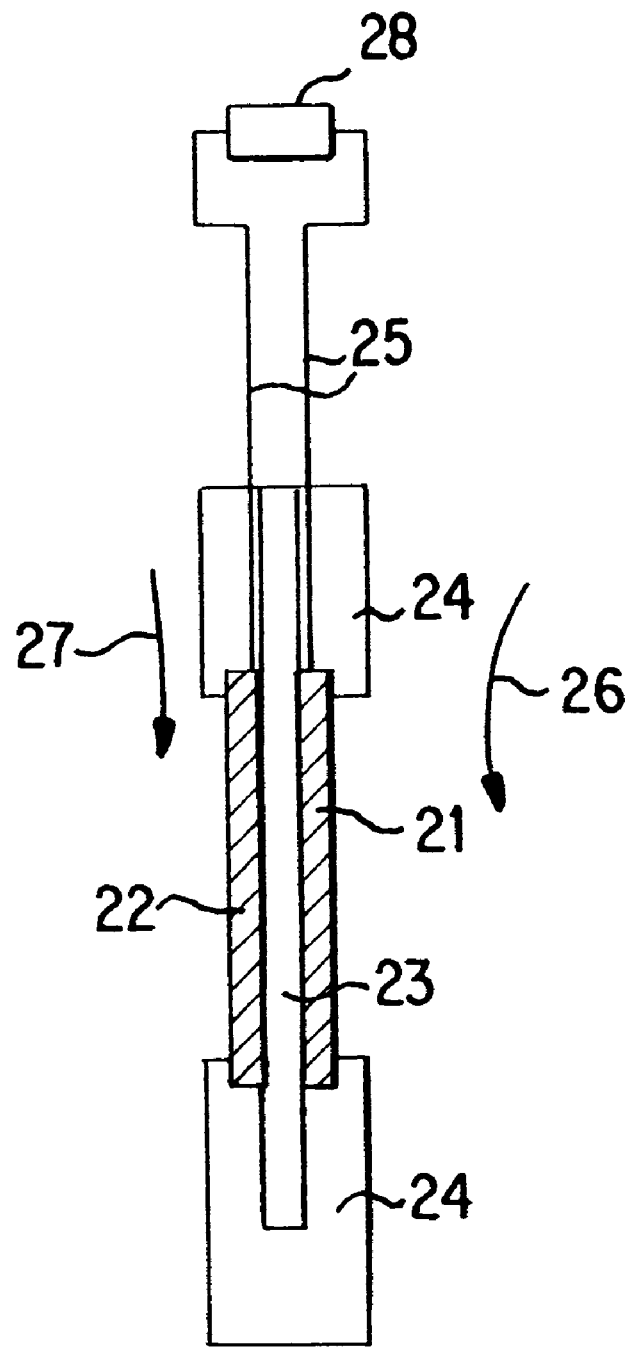
FIG. 2 is a schematic lateral view of a type of the sensors used in FIG. 1.

The construction of these three reformate quality sensors 12, 13, 14, illustrated in FIG. 2, corresponds to that of an individual fuel cell (of which a plurality is used in the fuel cell arrangement 1). The sensor contains two parallel electrodes 21, 22 which are mounted on opposite exterior surfaces of an ion-conducting membrane 23. The two electrodes 21, 22 may also be arranged in an ion-conducting electrolyte. This complex is housed in a housing 24, from which output electric connection lines 25 are contacted with the electrodes 21, 22. A first electrode 21 operating as an anode is exposed to the reformate flow 26, while the other electrode 22 acting as a cathode is acted upon by air 27, or by pure oxygen.

Thus, the sensor constructed according to FIG. 2 operates as a fuel cell which, in the presence of hydrogen in the reformate, generates electric energy that can be tapped at the connection lines 25. Since the sensor has an electrode structure which is comparable to that of the fuel cell stack in the fuel cell arrangement 1, its performance depends on the reformate quality in the same manner as the fuel cell arrangement 1 itself. This mainly applies to the important disturbance factors of carbon monoxide and methanol, but also to all other reformate constituents harmful to the fuel cell arrangement 1, even though these may possibly not yet be known as such. It is particularly advantageous to branch the air or oxygen flow 27 for the sensor off the oxygen feed line 9 of the fuel cell arrangement. In this case, the sensor simultaneously monitors the cathode supply air for the fuel cell arrangement 1, and will react directly like the cells of the fuel cell arrangement 1. As a result, this sensor construction permits reliable monitoring of the reformate quality with respect to the suitability in the fuel cell arrangement 1. So that the sensor reacts more sensitively than the fuel cell arrangement 1 itself, it is operated in a special manner, for which particularly the following variants can be used.

In a first method of operation, as illustrated in FIG. 2, a constant electric consuming device 28 is connected between the two electrodes 21, 22, and by means of current and/or voltage meters (not shown), either the current flowing through the consuming device 28 or the voltage drop across it (or both) are detected. As a result, even slight changes of the reformate quality can be detected, which is not so easily possible in the fuel cell arrangement 1 itself. The electric consuming device 28 may, for example, be a luminous diode whose operating condition is monitored.

In a second sensor operating mode, a constant voltage is applied by means of an external potentiostat circuit via the cell electrodes 21, 22, and the resulting current intensity is measured. The voltage is adjusted such that the electric current results from the conversion of hydrogen on the anode 21 and therefore reacts very sensitively to the reformate quality.

As an alternative, the sensor voltage can also be adjusted so that hydrogen as well as carbon monoxide is converted in the sensor. This measure is particularly advantageous for operation of a sensor 12 situated on the output side of the reforming reactor 4 because there, upstream of the reformate purification unit 5, 6, in addition to hydrogen, there is still a comparatively large amount of carbon monoxide in the reformate (for example, between 1% and 3%.) Even more precise sensor operation can be implemented by inserting a reference electrode on the air side of the sensor cell. This reference electrode may be an electrode area which is electrically separated from the cathode 22 but otherwise has the same construction, through which no current flows and thus, as a so-called air element, provides a constant reference voltage.

As desired, instead of the illustrated sensor construction having a fuel cell structure, other sensor constructions can also be used as reformate quality sensors, such as special CO-sensors by means of which the reformate quality can then be monitored particularly with respect to the CO-part.

As shown in FIG. 1, output signals of the three reformate quality sensors 12, 13, 14 are fed to a system control unit 15 which also receives information concerning the condition of the fuel cell arrangement 1 by way of a respective input line 16. In addition, the control unit 15 receives the output signal of a sensor 17 which monitors the composition of the methanol/water mixture before it enters the reforming reactor 4, thus forming a system monitoring component in the preliminary field of reformate production. The sensor 17 may, for example, be a conventional refraction index sensor, in which the refraction index of the gas mixture to be reacted can be determined in the vapor phase or in the still unevaporated liquid mixture condition. Such refraction index information permits the determination of the methanol/water mixture composition, thereby indicating the operating condition of the supplying and processing unit 3.

By means of the received output signals of the various sensors, the control unit 15 can constantly monitor the condition of the individual components of the reformate generating device 2, and thus the condition of the latter as a whole, to determine whether it generates a reformate which is suitable for the fuel cell arrangement 1. As soon as the control unit 15 determines that a faulty gas composition which would damage the fuel cell arrangement 1 because of an insufficient reformate quality exists at a point of the reformate flow path or of the gas mixture to be reacted which is monitored by the sensor upstream of the reforming reactor 4, it switches the valve 8 over by way of a corresponding control line 18. As a result, the reformate which is supplied by the reformate generating device 2, and which, during fault free system operation is transmitted by the valve 8 into the fuel cell arrangement 1, is diverted into a branch-off line 19 which bypasses the fuel cell arrangement 1 as a bypass line. In this manner, the control unit 15 timely prevents any reformate of an insufficient quality from entering the fuel cell arrangement 1.

In addition to interruption of the flow of reformate into the fuel cell arrangement 1 by switch-over of the valve 8, the control unit 15 also switches-off the supplying and processing unit 3 via a corresponding control line 20, which stops the reformate generating device 2. As a result, further production of reformate of an insufficient quality is stopped while the reformate of an insufficient quality which is still delivered by the reformate generating device 2 for a certain response time is carried away via the branch-off line 19 without damaging the fuel cell arrangement 1. Only when a sufficient reformate quality has again been reached, will the control unit 15 switch the valve 9 back again into the normal operating position, to feed reformate into the fuel cell arrangement 1.

As a further measure, as a function of the received sensor output signals the control unit 15 controls the quantity of oxygen which is supplied to the fuel cell arrangement 1 on the cathode side, by a corresponding controlling of the supply air control valve 29. In this case, the control unit 15 varies the supply air quantity fed to the fuel cell arrangement 1, particularly as a function of the CO-concentration in the reformate gas detected by the sensor, such that brief higher CO-concentrations remain harmless for the fuel cell arrangement, and can be tolerated without having to interrupt the reformate supply in such cases.

In addition, the system control unit 15 carries out all other necessary system control functions for the different system components, which is of no interest here and is therefore not shown in detail in FIG. 1. As an alternative, the control unit 15 may be a monitoring unit which is separate from the actual system control unit and whose function is limited to the reformate monitoring functionality described here in detail.

By means of the sensors arranged at several points of the reformate flow path, the control unit 15 can identify precisely the failed system component. In addition, the early warning time of the sensor for the control unit 15 will be longer, the farther the sensor is upstream from the fuel cell arrangement 1. In this manner, the valve 8 can be switched over earlier to interrupt the reformate flow into the fuel cell arrangement 1, and to remove the reformate into the branch-off line 19. On the other hand, the closer the sensor is situated in front of the fuel cell arrangement 1, the more completely it monitors the reformate generating device 2.

It is understood that numerous modifications of the illustrated system can be implemented within the scope of the invention. Thus, when the system is designed in a correspondingly changed manner, instead of methanol, another hydrocarbon can be used for obtaining hydrogen. In this case, the reformate generating device 2 has a conventional construction which is suitable for the respective application. If it appears desirable, fewer than the illustrated four sensors can be used as long as at least one sensor is present in the reformate flow path. The system according to the invention is suitable for mobile applications, for example, in motor vehicles, as well as for stationary uses.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy generating system comprising:
   a reformate generating device which contains a hydrocarbon reforming reactor and generates a high-hydrogen reformate;
   a fuel cell arrangement having an input which receives reformate generated by the reformate generating device via a reformate feed line;
   at least one reformate quality indicating sensor arranged in a reformate flow path;

a control unit;

at least one reformate flow control valve in the reformate feed line, said at least one reformate flow valve being controllable by the control unit to selectively interrupt a flow of reformate from the reformate generating device into the fuel cell arrangement as a function of an output signal of the at least one reformate quality indicating sensor; and a supply air control valve in an air or oxygen supply line of the fuel cell arrangement which valve can be controlled by the control unit as a function of an output signal of the at least one reformate-quality-indicating sensor.

2. The energy generating system according to claim 1, wherein at least one reformate quality indicating sensor is provided on each of input and output sides of a reformate purification unit of the reformate generating device, connected behind the reforming reactor.

3. The energy generating system according to claim 1 wherein:

the fuel cell arrangement comprises a plurality of identical fuel cells; and at least one reformate quality indicating sensor has a structure which is the same as that of an individual fuel cell.

4. The energy generating system according to claim 3 wherein on a cathode side, an oxygen-containing gas flow which is branched off an air or oxygen feed line of the fuel cell arrangement is supplied to at least one reformate quality indicating sensor having the structure of an individual fuel cell of the fuel cell arrangement.

5. The energy generating system according to claim 1 wherein, one reformate quality indicating sensor which detects a composition of a gas mixture to be reformed is arranged at an input of the reforming reactor.

6. A method for operating an energy generating system having a fuel cell arrangement coupled to receive a flow of high hydrogen reformate gas from a reformate generating device, said method comprising:

detecting a quality of said reformate gas;

selectively interrupting said flow of reformate gas from said reformate generator to said fuel cell arrangement when detected quality of said reformate gas falls below a predetermined value; and controlling a flow of oxygen input to said fuel cell arrangement in response to detected quality of said reformate gas.

7. A method for operating an energy generating system according to claim 6, wherein said step of detecting quality of said reformate gas comprises detecting a concentration of CO in said high hydrogen reformate gas.

8. An energy generating system comprising:

a reformate generating device which contains a hydrocarbon reforming reactor and generates a high-hydrogen reformate;

a fuel cell arrangement having an input which receives reformate generated by the reformate generating device via a reformate feed line;

at least one reformate quality indicating sensor arranged in a reformate flow path;

a control unit; and a supply air control valve arranged in an air or oxygen supply line connected at a cathode side input to the fuel cell arrangement, which valve is controllable by the control unit as a function of an output signal of the at least one reformate quality indicating sensor.

9. The energy generating system according to claim 8, wherein:

at least one reformate quality indicating sensor is provided respectively on each of an inlet side and on an outlet side of a reformate gas cleaning unit of the reformate gas generating device, connected downstream of a reforming reactor of said reformate generating device.

10. The energy generating system according to claim 9, wherein:

the fuel cell arrangement comprises a plurality of fuel cells of a uniform type; and at least one of the reformate quality indicating sensors is of the same type as at least one of these individual fuel cells.

11. The energy generating system according to claim 10, wherein at least one of the reformate quality indicating sensors detects a composition of the gas mixture to be reformed, and is arranged on an inlet side of the reforming reactor.

12. The energy generating system according to claim 11, wherein a flow of gas containing oxygen is delivered to the cathode side of at least one sensor which is of the same type as one of the individual fuel cells of the fuel cell arrangement, branching off from an air or oxygen supply line of the fuel cell array.

* * * * *